(12) United States Patent
Cressman

(10) Patent No.: US 7,890,314 B2
(45) Date of Patent: Feb. 15, 2011

(54) METHOD FOR MODELING PERFORMANCE OF EMBEDDED PROCESSORS HAVING COMBINED CACHE AND MEMORY HIERARCHY

(75) Inventor: David C. Cressman, Northbridge, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 576 days.

(21) Appl. No.: 11/951,219

(22) Filed: Dec. 5, 2007

(65) Prior Publication Data

US 2009/0150135 A1      Jun. 11, 2009

(51) Int. Cl.
G06F 9/44      (2006.01)
G06F 13/10     (2006.01)
G06F 13/12     (2006.01)
G06F 13/00     (2006.01)
G06F 13/28     (2006.01)

(52) U.S. Cl. ..................... 703/20; 711/151
(58) Field of Classification Search ............ 703/20; 711/151
See application file for complete search history.

(56) References Cited

U.S. PATENT DOCUMENTS 5,452,440 A * 9/1995 Salsburg .................. 711/136
6,487,126 B1 * 11/2002 Kawahara ............... 365/189.05
7,412,369 B1 * 8/2008 Gupta .......................... 703/14
2003/0149839 A1 * 8/2003 Kuwata ....................... 711/113
2004/0054689 A1 * 3/2004 Salmonsen et al. ....... 707/104.1

OTHER PUBLICATIONS

Uhlig, Richard A. et al., "Trace-Driven Memory Simulation: A Survey," ACM Computing Surveys, vol. 29, No., Jun. 1997, pp. 128-170.
Abraham, Santosh G. et al., "Automatic and Efficient Evaluation of Memory Hierarchies for Embedded Systems," Hewlett-Packard #HPL 1999-132, Oct. 1999, pp. 114-125.
Lebeck, Alvin R. et al., "Active Memory: A New Abstraction for Memory System Stimulation," ACM Computing Transactions on Modeling and Computer Simulation, vol. 7, No. 1, Jan. 1997, pp. 42-77.
Ravindran, Rajiv et al., "Retargetable Cache Simulation Using High Level Processor Models," IEEE 0-7695-0954-1/01, IEEE Jan. 2001, pp. 114-121.

* cited by examiner

*Primary Examiner*—Dwin M Craig
(74) *Attorney, Agent, or Firm*—David K. Lucente

(57) ABSTRACT

A method allocating firmware objects between different types of memory in a product model based on a frequency of access of each firmware object in trace data. The allocated firmware objects and trace data are used to simulate the performance of the product model. Memory access statistics obtained during the simulation may be used to analyze product model performance in the frequency and time domains.

27 Claims, 5 Drawing Sheets

METHOD FOR MODELING PERFORMANCE OF EMBEDDED PROCESSORS HAVING COMBINED CACHE AND MEMORY HIERARCHY

SUMMARY

The area of an application-specific integrated circuit (ASIC) is a key determiner of cost. On chip memory typically occupies a large percentage of the area of the ASIC. Thus, in the design of ASICs, the amount of memory required and optimal allocation of that memory are important factors. Often in the design of ASICs, "gut feel" and experience have been used to determine memory size, with little attention paid to empirical data or analysis. The suitability of the memory size for a specific ASIC remained unknown until hardware was created and tested. As a result, memory sizes were generally chosen to be significantly larger than necessary to ensure that performance was adequate. These unnecessarily large memory sizes, however, led to the creation of large and expensive ASICs.

A trace driven cache simulation can simulate ASIC performance in a purely cache memory system. In order to simulate the performance of the pure cache memory system, a trace of the firmware is taken on a similar system running a real workload. The simulation then uses that trace of the firmware to evaluate the performance of a defined pure cache memory system. By collecting and analyzing statistics on the performance of the firmware trace stream, for example, the number of reads and the number of writes, a user can determine whether the pure cache memory system defined in the simulation would perform adequately with the given firmware trace stream. Pure cache memory systems, however, are often unfeasible because of the size of the cache required to perform adequately and the associated expense.

Implementations described and claimed herein address the foregoing problems by providing for predicting the performance of an embedded processor with a combined cache and memory hierarchy and automatically reconfiguring the allocation of firmware objects and data between high speed memory and lower speed memory. Thus, the performance characteristics of a range of processor memory and caching designs can be analyzed and compared efficiently and cost-effectively.

BRIEF DESCRIPTIONS OF THE DRAWINGS

FIG. 1 illustrates an exemplary simulation of the performance of a proposed product design, including inputs to the simulation and outputs generated by the simulation.

FIG. 2 schematically illustrates a model of a product design used in the simulation shown in FIG. 1.

DETAILED DESCRIPTION

ASIC performance may be enhanced in a cost-effective manner by combining a cache having a backing store with high speed on-chip memory. The size of the cache and high speed on-chip memory remain factors in determining the cost of the ASIC. Further, data must be allocated between the backing store and the high speed memory. Performance of an ASIC with a combined cache and memory hierarchy could be evaluated by designing and building an ASIC with configurable memory, cache, and programmable processor speeds to test different combinations of cache memory and high speed memory. However, such testing would be time consuming and cost prohibitive. Thus, there exists a need to accurately simulate the performance of proposed embedded hardware/software product designs without requiring time consuming and cost prohibitive testing.

Figure 1:
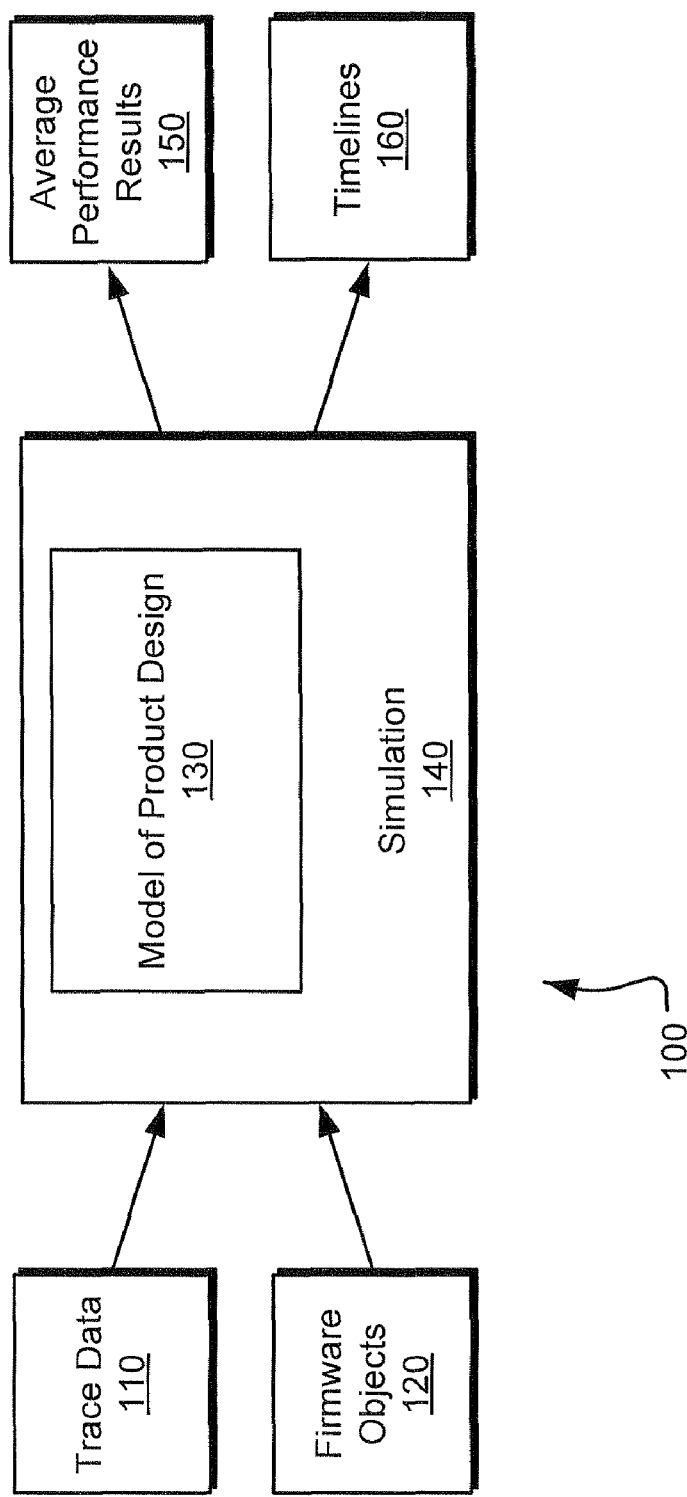

FIG. 1 illustrates an exemplary simulation of the performance of a proposed product design, including inputs to the simulation and outputs generated by the simulation 140. In an implementation, the product design 130 may be an embedded processor coupled to different types of memory. The different types of memory may be a faster memory and a slower memory and, further, the memories may be of different sizes. The embedded processor may be coupled to a combined cache and memory hierarchy. The cache may, for example, be coupled to memory such as dynamic random access memory (DRAM). Further, the product design 130 includes the sizes of the different types of memory, processor speed, and other parameters relating to the proposed product design.

In order to simulate performance of the product design 130, the simulation 140 uses trace data 110 and a set of firmware objects 120. In an implementation, the firmware objects may be defined in a link-map. The trace data 110 may be, for example, a trace of the firmware stream generated by firmware objects 120 while running an existing product. In an implementation, the trace data could be generated by running a system, such as a disk system, utilizing a set of firmware objects under a specified workload. In an implementation, trace data may be generated using, for example, Iometer (http://www.iometer.org). In an implementation, the trace data may include the size and access frequency of each firmware object in the set of firmware objects. In another implementation, the trace data may also include timing data.

Using information contained in trace data 110, simulation 140 automatically allocates the firmware objects 120 to the different types of memory in the product design 130. In an implementation, firmware objects may be allocated to different types of memory based on access frequency or size. Further, heuristics may be applied to allocate the firmware objects among different types of memory. In one implementation, specific firmware objects may be allocated to different types of memory by a user or design engineer. In another implementation, the simulation may generate histograms based on the access frequencies of the firmware objects.

The simulation 140 then simulates the performance of the product design 130 using the new allocation of the firmware objects 120 and the trace data 110. During simulation 140, memory access statistics are collected, such as cache hit and cache miss data, total number of instruction fetches, data reads, and data writes are collected and used to assess the performance of the product design 130. In an implementation, average performance results 150 of the product design 130 may be generated by analyzing the collected memory access statistics. Other factors which may be used to analyze average performance may include, for example, processor speed, memory speeds, and memory contentions. In another implementation, timelines 160 may be generated by analyzing memory access events in the time domain. The time domain may be defined, for example, by time count, instruction count, or interrupt events. In yet another implementation, the simulation may process multiple proposed product designs in parallel, so that the performance of several product designs may be compared.

Figure 2:
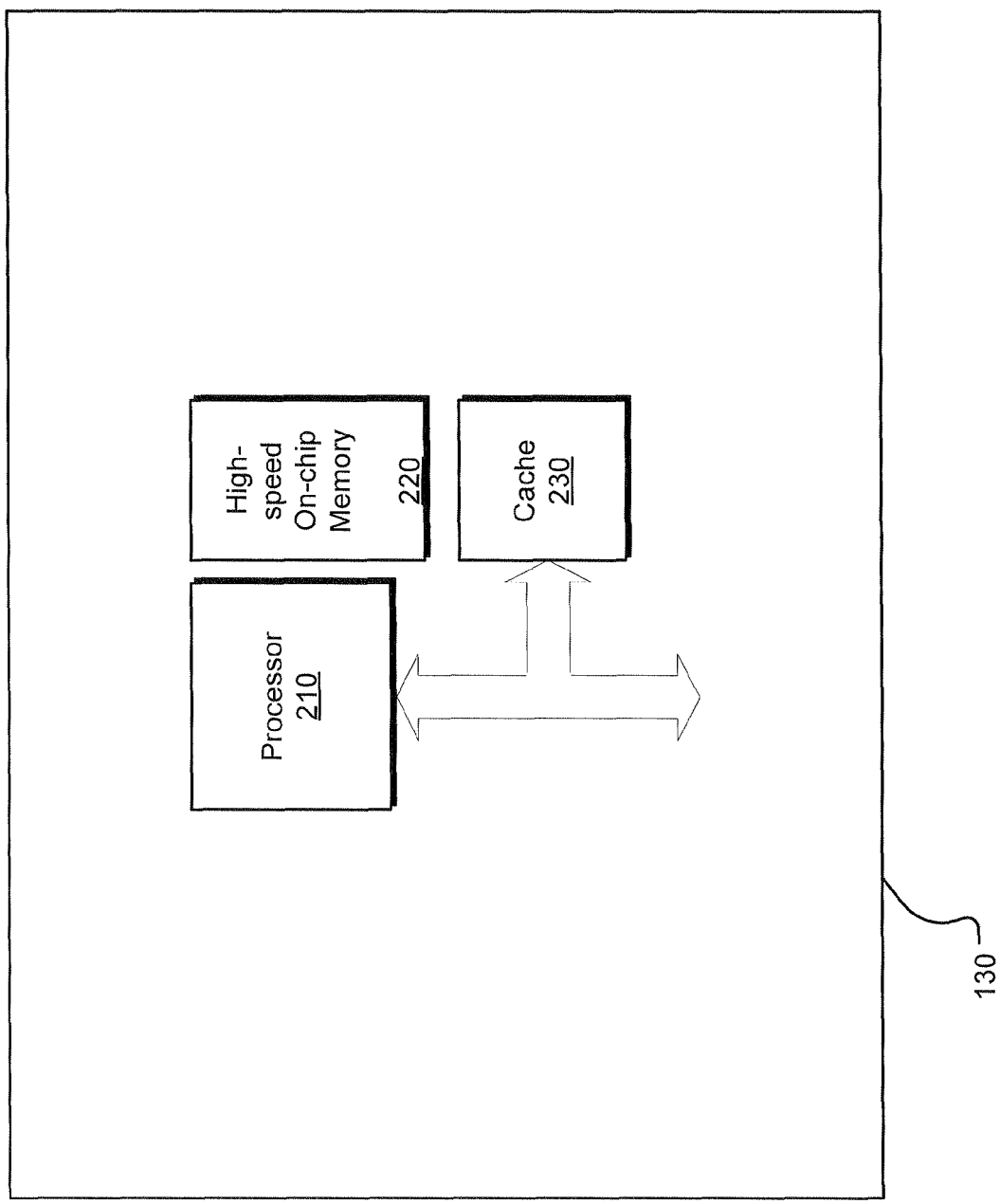

FIG. 2 schematically illustrates a model of the product design 130 used in the simulation 140 shown in FIG. 1. The product design 130 may be, for example, an embedded processor for use in an ASIC. However, it should be understood that the proposed product design may be any product design in which firmware objects are to be allocated among different types of memory. In an implementation, the processor may be a policy or controller processor relating to host interface and internal processing or a servo processor dedicated to seeking to a designated track, staying on a designated track, or setting up read-write channels. As shown in FIG. 2, processor 210 is coupled to two different types of memory in the form of high-speed on-chip memory 220, such as static random access memory (SRAM), and cache 230, which is coupled to an external memory such as dynamic random access memory (DRAM). In an implementation, the high-speed on-chip memory may be divided among data and code or instruction items. Further, it should be understood that the processor may be coupled to any number of different types of memory.

According to an implementation, the different types of memory may provide for different access speeds. Tightly-coupled memory, for example, is an on-chip memory that has low latency and may provide for the best memory access performance. Thus, high-speed on-chip memory may be well-suited for storing information that is accessed frequently or requires little storage space. However, because it is an on-chip memory, high-speed on-chip memory is expensive and may have a significant impact on the overall size of the chip.

Cache, in contrast, coupled to an external memory leverages the value of that external memory. Thus, it may be more cost-effective to implement in the design of a product. Cache keeps a relatively small quantity of information available for immediate access. When the information requested by the processor is found in the cache, a cache "hit" occurs, and latency is low. However, if the information requested by the processor is not held in cache at the time of the request, a cache "miss" occurs. The desired information must be retrieved from the external memory by the cache before it can be sent to the processor, which increases access time. Accordingly, DRAM has a higher latency than high-speed on-chip memory. Thus, slower types of memory, such as DRAM coupled with a cache, may be well-suited for storing information that is too large to store in high-speed on-chip memory or information that is accessed infrequently.

By using a combination of high-speed on-chip memory and a different, a more cost-effective type of memory, such as cache coupled to a backing store such as DRAM, the amount of high-speed on-chip memory required to achieve desired performance may be reduced while still achieving the desired processor performance. It should be understood that different types of memory may be combined to achieve the desired processor performance.

Figure 3:
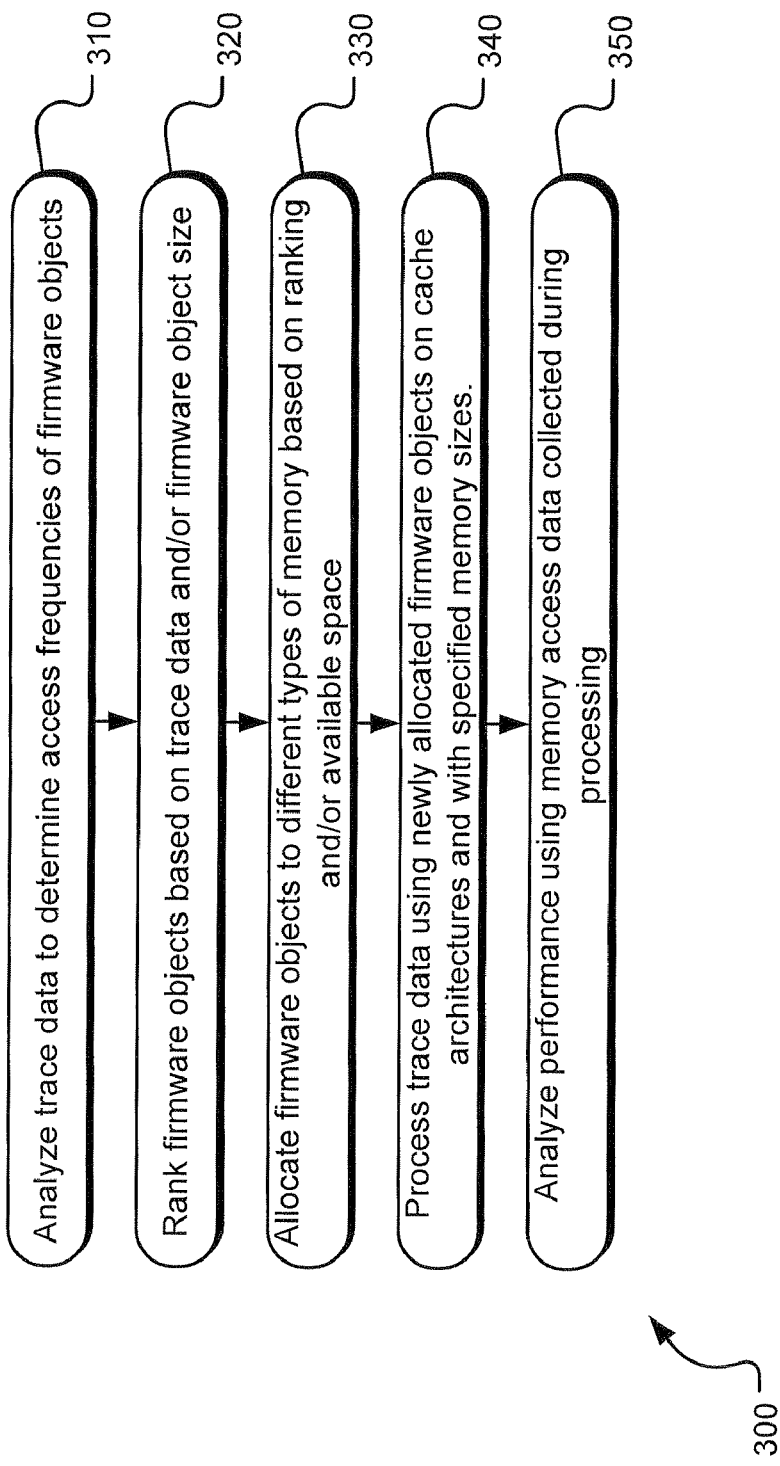
FIG. 3 illustrates exemplary operations for allocating firmware objects between different types of memory.

FIG. 3 illustrates an implementation of operations for allocating firmware objects between different types of memory. After trace data is generated using a similar existing product design, the trace data is analyzed in operation 310 to acquire data regarding the firmware objects. In an implementation, the trace data may be analyzed to determine access frequency, which is number of times each firmware object was accessed when the trace data was generated, and this varies depending on the specific workload applied. In another implementation, the trace data may be analyzed to obtain other information which may be used to allocate the firmware objects among the different types of memory.

In operation 320, each of the firmware objects is ranked. In an implementation, the firmware objects may be ranked based on access frequency, size, or both access frequency and size. In another implementation, heuristics may be applied to generate a "goodness value," which is then used to rank the firmware objects. The heuristics applied may, for example, weigh the access frequency and the size of each firmware object against the space remaining in the high-speed on-chip memory, creating a "goodness value" for each firmware object such that the code and data objects having the most value are ranked above those having less value. In an implementation, application of heuristics may be iterative.

In operation 330, each firmware object is allocated to one of the different types of memory based on the ranking and size. For example, if the firmware objects are ranked based on access frequency, those firmware objects that are accessed most frequently may be placed into the higher speed memory, such as high-speed on-chip memory, and those firmware objects accessed less frequently in the existing product design may be allocated to cache. Alternatively, if the firmware objects are assigned a goodness value using an heuristic, those firmware objects having the highest goodness values may be allocated to a higher speed memory, and firmware objects having lower goodness values may be assigned to a slower memory. In an implementation, a threshold goodness value may be set. Those firmware objects having goodness values that meet or exceed the threshold value may be assigned to a first type of memory, and those firmware objects having goodness values that do not meet the threshold may be assigned to a first type of memory or a second type of memory, based on space. In another implementation, firmware objects will be allocated to the higher speed memory, based on ranking, until the higher speed memory is full, and the remaining firmware objects will be allocated to the lower speed memory. In still another implementation, firmware objects may be allocated to specific memories.

In an implementation, the addresses of the firmware objects are translated by the simulation. For each firmware object, the original address of the firmware object from the trace is used, and a search is performed to determine where the firmware item corresponding to that address is located in the product model. The original address of the firmware object is then translated to be consistent with the allocation of the firmware object in the model product design. This re-mapped address can then be used to simulate the performance of the product design.

In operation 340, the trace data is processed against the newly allocated firmware objects to simulate the performance of the product design. As the simulation occurs, data regarding the simulated accesses of the different types of memory are collected. In an implementation, statistics collected may include, for example, a number of instructions processed, a number of cache accesses, a number of cache hits, a number of cache misses, and a number of cache flushes (the number of times the backing store is accessed). It should be understood that other access statistics may be collected during the simulation.

The performance of the product design is analyzed and assessed in operation 350, using the memory access data collected during the simulation of the product design. It should be understood that other information regarding the simulation, such as processor speed, memory speed, and processor design may also be used to evaluate the performance of the product design. Further, it should be understood that multiple product designs can be simulated simultaneously.

In one implementation, performance of the product design may be assessed by analyzing data from the simulation in the frequency domain. For some types as processing work, such as storage interface processing, it may be sufficient to analyze average performance statistics, such as cache access rate, cache miss rate, total miss rate, writeback rate per miss, miss penalties, non-sequential access, wait time, the number of cycles per instruction, the backing store (such as DRAM) access rate, processor backing store utilization, and the speed of instruction execution in millions of instructions per second (MIPS). The average number of instructions actually processed per second is indicative of effective processing power.

In another implementation, performance of the product design may be assessed by analyzing data from the simulation in the time domain by generating timeliness Analysis of performance in the time domain is of particular importance when performance in real-time is critical, such as with servo processors. Time may be defined, for example, by time count, instruction count, or a periodic event such as an interrupt.

Figure 4:
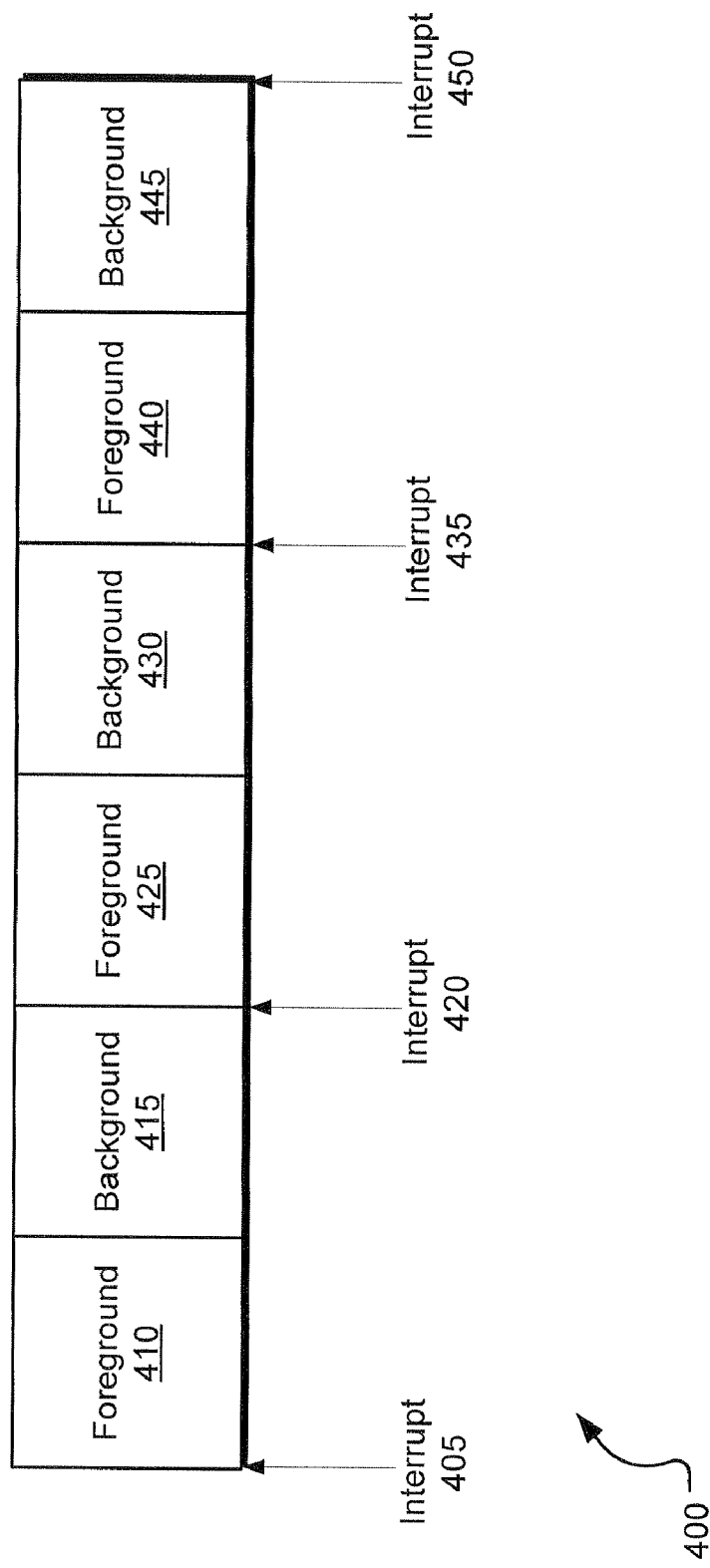
FIG. 4 illustrates a conceptual diagram of a timeline generated for a servo processor from memory access data collected during a simulation.

FIG. 4 illustrates conceptual diagram of a timeline generated for a servo processor from memory access data collected during a simulation. FIG. 4 shows a timeline generated over three interrupt events during the simulation. Each interrupt event is divided into a foreground section 410, 425, 440 representing interrupt processing and a background section 415, 430, 445 representing non-interrupt processing, respectively. Each foreground section is representative of when a servo wedge is encountered, which creates high priority interrupts 405, 420, 435, and 450 to the servo firmware. With each interrupt to the servo firmware, some amount of processing, which may vary from interrupt to interrupt, needs to be accomplished. Servo wedges, however, are generally encountered at a very regular rate and their processing must be accomplished within a fixed amount of time. In an implementation, the system may allow for one overrun. That is, if interrupt processing relating to a first servo wedge cannot be completed before the second servo wedge is encountered, processing will still continue. Further, as the interrupt processing occurs, non-interrupt processing is also occurring. However, if a third servo wedge is encountered before processing for the first has completed, a double overrun occurs, and all processing stops. For example, if the interrupt processing in foreground 410 is not completed before interrupt request 435 is received, processing will stop. Thus, analysis of memory access data in the time domain is necessary to evaluate the performance of a proposed servo processor design.

Using time as a frame of reference, as shown in FIG. 4, the performance of the product design can be analyzed in real time. For each period of foreground and background processing, the memory access data during that period can be determined. The memory access data may include the number of instructions processed, the number of high speed memory accesses, the total number of cache references, cache hit data, cache miss data, and cache flushes (the number of backing store accesses), among other information. This information can then be analyzed graphically to evaluate performance of the product design during relatively short but time-critical periods of processing.

Thus, firmware objects used in an existing product can be automatically allocated in a proposed product design. Further, the newly allocated firmware objects can be used to simulate the performance of the proposed product design. Memory access data collected during the simulation can then be used to evaluate the performance of the proposed product design by analyzing the data in the frequency and time domains. Further, proposed product designs may be simulated simultaneously to efficiently evaluate proposed product models.

Figure 5:
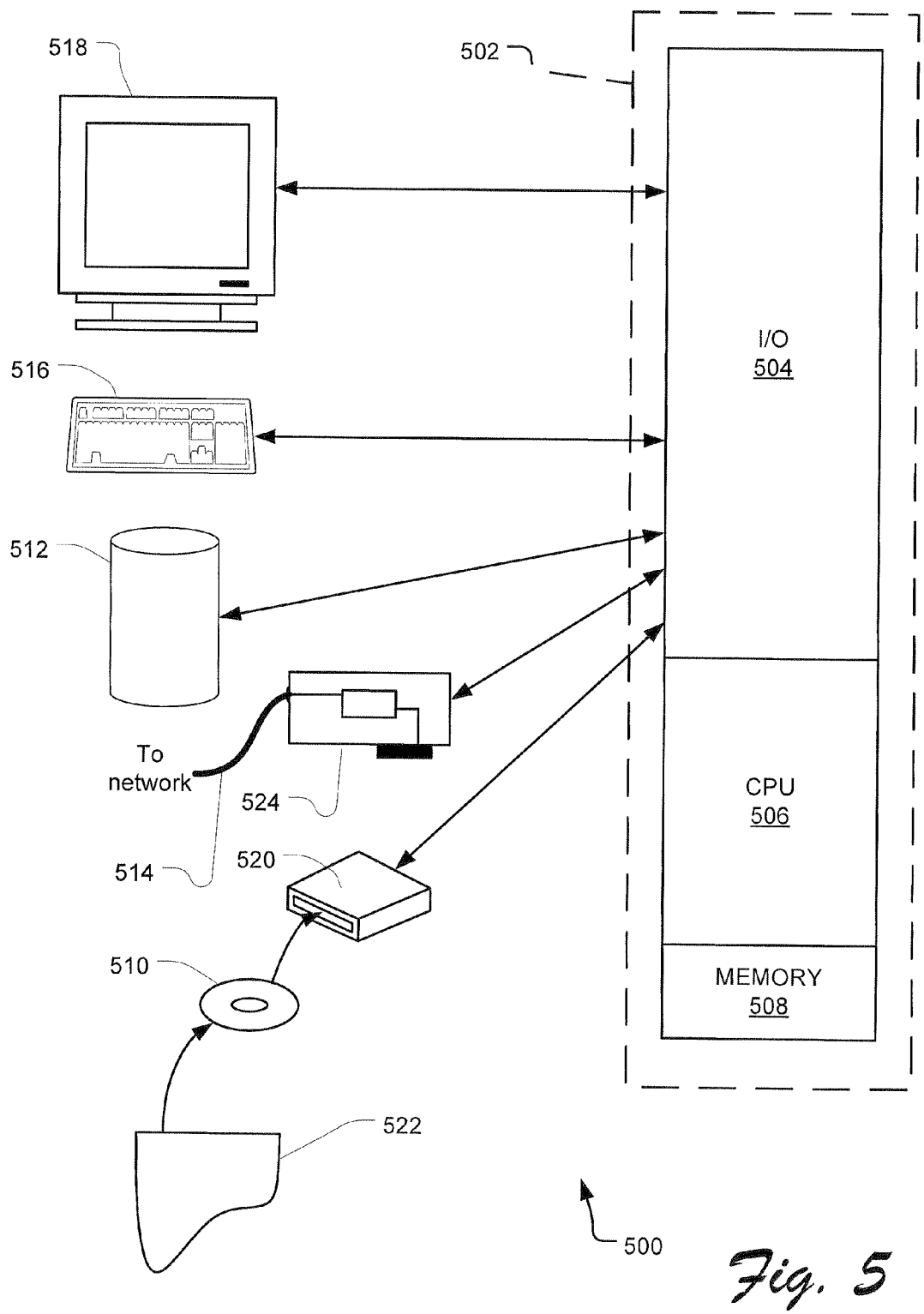
FIG. 5 illustrates components of an example system that can be useful in the implementation of the described technology.

FIG. 5 illustrates components of an example system that can be useful in the implementation of the described technology. A general purpose computer system 500 is capable of executing a computer program product to execute a computer process. Data and program files may be input to the computer system 500, which reads the files and executes the programs therein. Some of the elements of a general purpose computer system 500 are shown in FIG. 5 wherein a processor 502 is shown having an input/output (I/O) section 504, a Central Processing Unit (CPU) 506, and a memory section 508. There may be one or more processors 502, such that the processor 502 of the computer system 500 comprises a single central-processing unit 506, or a plurality of processing units, commonly referred to as a parallel processing environment. The computer system 500 may be a conventional computer, a distributed computer, or any other type of computer. The described technology is optionally implemented in software devices loaded in memory 508, stored on a configured DVD/CD-ROM 510 or storage unit 512, and/or communicated via a wired or wireless network link 514 on a carrier signal, thereby transforming the computer system 500 in FIG. 5 to a special purpose machine for implementing the described operations.

The I/O section 504 is connected to one or more user-interface devices (e.g., a keyboard 516 and a display unit 518), a disk storage unit 512, and a disk drive unit 520. Generally, in contemporary systems, the disk drive unit 520 is a DVD/CD-ROM drive unit capable of reading the DVD/CD-ROM medium 510, which typically contains programs and data 522. Computer program products containing mechanisms to effectuate the systems and methods in accordance with the described technology may reside in the memory section 504, on a disk storage unit 512, or on the DVD/CD-ROM medium 510 of such a system 500. Alternatively, a disk drive unit 520 may be replaced or supplemented by a floppy drive unit, a tape drive unit, or other storage medium drive unit. The network adapter 524 is capable of connecting the computer system to a network via the network link 514, through which the computer system can receive instructions and data embodied in a carrier wave. Examples of such systems include personal computers offered manufacturers of Intel-compatible computing systems, PowerPC-based computing systems, ARM-based computing systems, and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 500 is connected (by wired connection or wirelessly) to a local network through the network interface or adapter 524, which is one type of communications device. When used in a WAN-networking environment, the computer system 500 typically includes a modem, a network adapter, or any other type of communications device for establishing communications over the wide area network. In a networked environment, program modules depicted relative to the computer system 500 or portions thereof, may be stored in a remote memory storage device. It is appreciated that the network connections shown are exemplary and other means of and communications devices for establishing a communications link between the computers may be used.

In an example implementation, a pre-processor, a classifier module, and other modules may be embodied by instructions stored in memory 508 and/or storage devices 512 or storage media 510 and processed by the processing unit 506. Classified data sets, unclassified data sets, vectorized data, mapped data, and other data may be stored in memory 508 and/or storage devices 512 or storage media 510 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method comprising:
   determining access frequencies of firmware objects;
   ranking the firmware objects based on the access frequency of each firmware object; and
   allocating the firmware objects between a high-speed on-chip memory and a cache coupled to an external memory based on the ranking of the firmware objects.

2. A method according to claim 1, wherein the high-speed on-chip memory operates at a higher speed than the cache coupled to the external memory.

3. A method according to claim 1, further comprising
   defining a threshold for the frequency of accesses, and allocating firmware objects having access frequencies that exceed the threshold value to a first type of memory.

4. A method according to claim 1, further comprising
   allocating firmware objects between the high-speed on-chip memory and the cache coupled to the external memory based on a size of each firmware object.

5. A method according to claim 1, wherein the allocation of each firmware object is based on the access frequency of the firmware object and a size of the firmware object.

6. A method according to claim 1, wherein a firmware object is locked into one of the high-speed on-chip memory and the cache coupled to the external memory.

7. A method according to claim 1, further comprising
   processing the trace data using the allocated firmware objects.

8. A method according to claim 7, further comprising
   analyzing memory access data acquired during the processing of the trace data to analyze average performance.

9. A method according to claim 7, further comprising
   generating a timeline object from memory access data acquired during the processing of the trace data to analyze performance in the time domain.

10. A method according to claim 9, wherein the memory access data includes at least one of cache hits, cache misses, or instruction counts.

11. A method according to claim 9, wherein the time domain is defined by time count, instruction count, interrupt, or other periodic event.

12. The method of claim 1, further comprising:
    building a product with an processor connected to a quantity of the high-speed on-chip memory sufficient to store the firmware objects allocated to the high-speed on-chip memory and a quantity of the cache sufficient to store the firmware objects allocated to the cache.

13. The method of claim 1, wherein the determining operation is accomplished by analyzing trace data.

14. A method comprising:
    analyzing trace data to obtain information regarding firmware objects;
    ranking the firmware objects based on the trace data; and
    allocating the firmware objects to a high-speed on-chip memory and a cache coupled to an external memory based on ranking.

15. A method according to claim 14, wherein the high-speed on-chip memory operates at a higher speed than the cache coupled to the external memory.

16. A method according to claim 14, wherein ranking includes
    sorting the firmware objects based on access frequency.

17. A method according to claim 16, wherein ranking further includes
    assigning values to the firmware objects based on heuristics, and
    sorting the firmware objects based on the assigned values.

18. A method according to claim 14, wherein ranking includes
    sorting the firmware objects based on the size and access frequency of each firmware object.

19. A method according to claim 14, further comprising
    simulating performance by processing the trace data using the allocated firmware objects.

20. A method according to claim 19 wherein, during the simulation, memory access data is acquired in at least one of the time domain or the frequency domain.

21. A method according to claim 20, wherein memory data includes at least one of cache hits, cache misses, or instruction counts.

22. A method according to claim 19, further comprising analyzing memory access data to assess system performance.

23. A method according to claim 22, wherein memory access data is analyzed in the time domain.

24. A method according to claim 22, wherein memory access data is analyzed in the frequency domain to assess average performance.

25. The method of claim 14, further comprising:
building a product with an processor connected to a quantity of the high-speed on-chip memory sufficient to store the firmware objects allocated to the high-speed on-chip memory and a quantity of the cache sufficient to store the firmware objects allocated to the cache.

26. One or more computer readable storage media storing computer executable instructions for executing a computer process for allocating firmware objects to memory, the computer process comprising:

analyzing trace data to obtain information regarding firmware objects;
ranking the firmware objects based on the trace data; and
allocating the firmware objects to a high-speed on-chip memory and a cache coupled to an external memory based on ranking.

27. The one or more computer readable storage media of claim 26, wherein the computer process further comprises:
building a product with an processor connected to a quantity of the high-speed on-chip memory sufficient to store the firmware objects allocated to the high-speed on-chip memory and a quantity of the cache sufficient to store the firmware objects allocated to the cache.

* * * * *